United States Patent [19]
Okamoto

[11] Patent Number: 5,225,755
[45] Date of Patent: Jul. 6, 1993

[54] MOTOR SERVO CIRCUIT FOR DISC REPRODUCTION APPARATUS

[75] Inventor: Nobuhiro Okamoto, Takarazuka, Japan

[73] Assignee: Sanyo Electric Co., Ltd., Osaka, Japan

[21] Appl. No.: 677,694

[22] Filed: Mar. 29, 1991

[30] Foreign Application Priority Data

Mar. 31, 1990 [JP] Japan .................................. 2-86959
Mar. 31, 1990 [JP] Japan .................................. 2-86960

[51] Int. Cl.⁵ ......................... G11B 15/46; H02P 5/50
[52] U.S. Cl. .................................... 318/685; 318/561;
388/813; 369/44.29; 369/44.32
[58] Field of Search ............. 318/685, 568.18, 568.22,
318/635, 560, 561; 388/813; 369/44.32, 44.28,
44.29, 44.26, 77.04, 58

[56] References Cited

U.S. PATENT DOCUMENTS

| | | | |
|---|---|---|---|
| 4,079,302 | 3/1978 | Norton | 318/632 |
| 4,365,324 | 12/1982 | Michaelis | 634/44 |
| 4,675,749 | 6/1987 | Banno et al. | 358/342 |
| 4,777,530 | 10/1988 | Kondo | 358/160 |
| 4,783,774 | 11/1988 | Enomoto | 369/44 |
| 4,839,881 | 1/1989 | Takahara et al. | |
| 4,878,211 | 10/1989 | Suzuki et al. | 369/44 |
| 4,975,626 | 12/1990 | Yagi et al. | 318/567 |

FOREIGN PATENT DOCUMENTS 0332169 9/1989 European Pat. Off. .

OTHER PUBLICATIONS

"A Method of Omitting Image Rotation Component in Video Tracking", pp. 1023-1026, IEEE International Conference on Systems, Man and Cybernetics, Aug. 8-12, 1988.
Patent Abstracts of Japan, JP A 62 136 987.
Patent Abstracts of Japan, JP A 1 270 458.
Patent Abstracts of Japan, JP A 2 123 877.

*Primary Examiner*—William M. Shoop, Jr.
*Assistant Examiner*—Brian Sircus
*Attorney, Agent, or Firm*—Armstrong, Westerman, Hattori, McLeland & Naughton

[57] ABSTRACT

In a LD player, a phase comparison circuit compares the phases of a horizontal synchronizing signal reproduced from a LD with a reference synchronizing signal to generate a phase error signal having a pulse width according to the phase difference. After the phase error signal is amplified by an equalizer amplifier, this phase error signal is supplied to a motor driving circuit, whereby phase servo control is carried out for the spindle motor. After the start of the reproduction of the disc, a variation amount of the phase error signal during a period corresponding to a predetermined number of rotation of the disc is detected as the eccentricity amount of the rotation of the disc. The duty ratio of the phase error signal is digital-modulated according to the eccentricity amount, whereby the servo gain of the entire servo circuit is corrected to an optimum value.

21 Claims, 12 Drawing Sheets

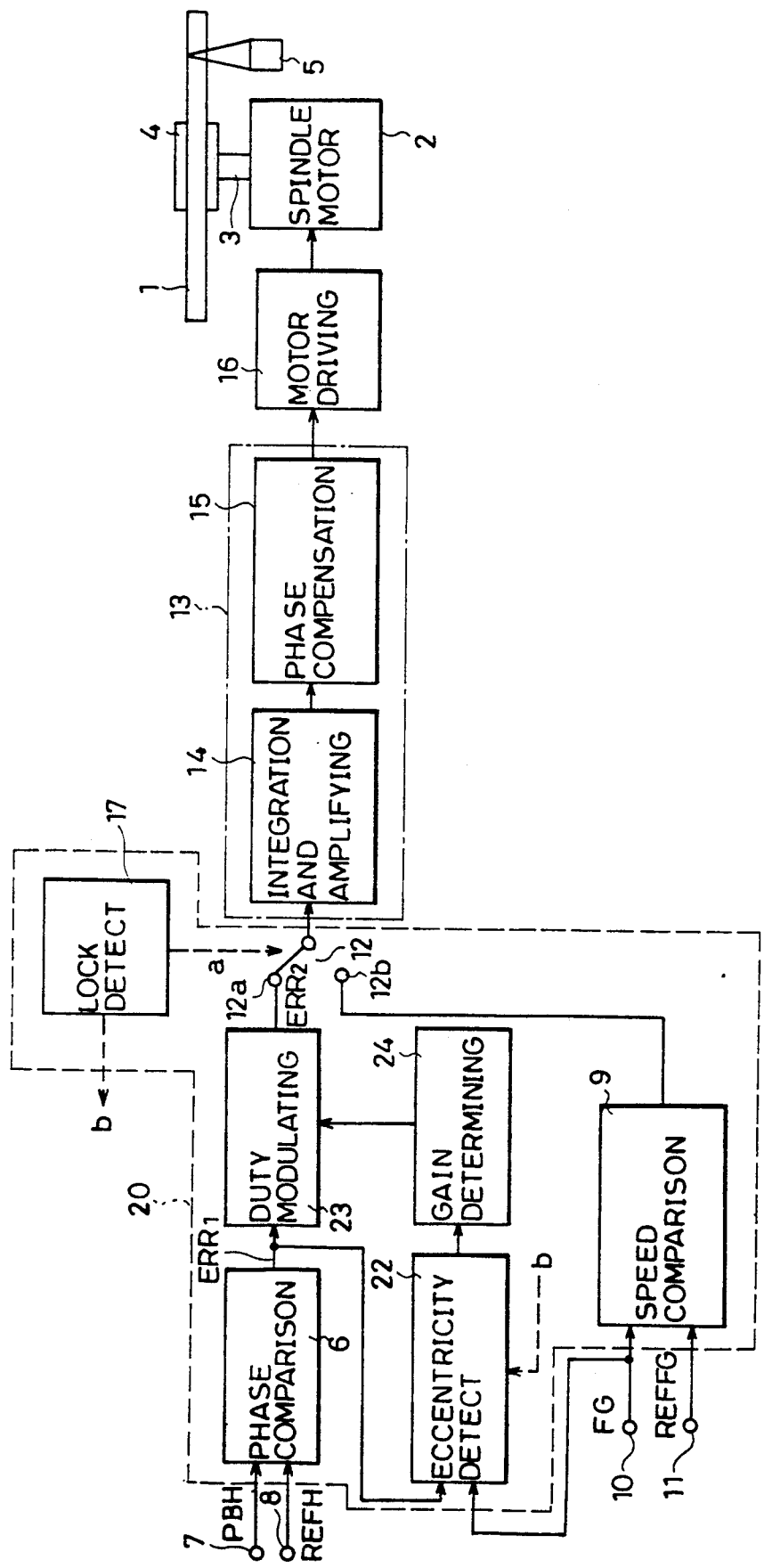

MOTOR SERVO CIRCUIT FOR DISC REPRODUCTION APPARATUS

BACKGROUND OF THE INVENTION

1. Field of the Invention

The present invention relates to motor servo circuits for disc reproduction apparatus, and more particularly, to a motor servo circuit controlling mainly the phase of a spindle motor used for rotating a disc in a reproduction apparatus of optical discs such as laser discs (referred to as LD hereinafter) and compact discs (referred to as CD hereinafter).

2. Description of the Background Art

A conventional reproduction- apparatus of an optical disc such as a LD and a CD is provided with a motor servo circuit for servo controlling the phase and speed of a spindle motor for the rotation driving of an optical disc. FIG. 1 is a block diagram schematically showing a structure of such a motor servo circuit in a laser disc player (LD player) as an example of an optical disc reproduction apparatus.

Referring to FIG. 1, a LD1 is loaded on a chucking device 4 constituted by a turntable and a clamper provided at the top end of a spindle 3 of a spindle motor 2 at the time of reproduction of LD. LD1 is held by chucking device 4 and rotated. The information recorded on the signal face of LD1 is read by an optical pickup 5 to be supplied to a signal processing circuit not shown.

Spindle motor 2 is provided with a FG pulse generator not shown. This FG pulse generator generates a FG pulse signal having a frequency proportional to the rotating speed of spindle motor 2. The FG pulse signal is supplied to one input terminal 10 of a speed comparison circuit 9. The other input terminal 11 is supplied with a reference FG signal REFFG of a reference frequency provided from an oscillation circuit not shown.

At the start of the reproduction operation of LD1, spindle motor 2 is actuated by a speed error signal provided from speed comparison circuit 9. More specifically, speed comparison circuit 9 compares the frequency of the FG signal supplied to input terminal 10 with that of the REFFG signal supplied to input terminal 11 to generate a speed error signal having a pulse width proportional to the difference therebetween. The speed error signal is applied to a motor driving circuit 16 via a switch circuit 12 connected to the side of contact 12b at the initial state of the rotation drive of spindle motor 2 and via an equalizer amplifier 13 that will be explained later on. Motor driving circuit 16 is responsive to the output of equalizer amplifier 13 to actuate the rotation of spindle motor 2.

When the rotating speed of spindle motor 2 approaches a predetermined rotating speed by the rotation drive of motor driving circuit 16, the rotating speed of spindle motor 2 is captured to the aforementioned predetermined speed by a speed servo according to the aforementioned speed error signal.

When the rotating speed of spindle motor 2 started to be captured to a predetermined speed, a condition wherein the recorded information can be read out from the signal face of LD1 is established. The horizontal synchronizing signal in the video signal read out by optical pickup 5, i.e. the PBH signal is separated by a signal processing circuit not shown and supplied to one input terminal 7 of phase comparison circuit 6. The other input terminal 8 is supplied with a reference horizontal synchronizing signal REFH having a reference phase provided from an oscillation circuit not shown. Phase comparison circuit 6 compares the phase of the PBH signal supplied to input terminal 7 with that of the REFH signal supplied to input terminal 8 to generate a phase error signal having a pulse width proportional to the magnitude of shift of the phase of the PBH signal from the reference phase.

The PBH signal separated at the signal processing circuit not shown is supplied to a lock detecting circuit 57. Lock detecting circuit 57 detects the period of the PBH signal to generate a speed lock detection signal a for providing the same to the control input of switch circuit 12, when the detected period is within ±20% range of a predetermined period of 63.5 micro seconds. Switch circuit 12 responds to the speed lock detection signal a to be switched to the side of contact 12a.

As a result, the phase error signal provided from phase comparison circuit 6 is supplied to equalizer amplifier 13 via switch circuit 12. Equalizer amplifier 13 is constituted by an integration and amplifying circuit 14, and a phase compensation circuit 15. Integration and amplifying circuit 14 implements a low pass filter processing for the applied phase error signal, and amplifies the obtained signal. Phase compensation circuit 15 functions to compensate for phase delay by 90° of the phase error signal associated with the low pass filter processing by integration and amplifying circuit 14.

The phase error signal from equalizer amplifier 13 is supplied to motor driving circuit 16. In response, motor driving circuit 16 drives the rotation of spindle motor 2 to capture the rotation phase of spindle motor 2 to a reference phase.

At the time of LD reproduction, there is periodical time base variation in the rotation of the LD caused by eccentricity of the LD itself, or that of the chucking device of the LD player. Therefore, circuit constants of the above mentioned equalizer amplifier 13 are set to values so that the servo characteristics of the entire phase servo circuit constituted by phase comparison circuit 6, equalizer amplifier 13, motor driving circuit 16 and spindle motor 2 can capture the rotation phase of spindle motor 2 to a reference phase and suppress periodical time base variation of the LD rotation caused by various eccentricity.

The magnitude of eccentricity (eccentricity amount) of the above mentioned disc rotation differs greatly depending on the reproduced discs and is not uniform. It is therefore desired that various servo characteristics of the phase servo circuit are prepared so as to conform to the wide range of eccentricity amount. However, this is difficult to realize due to limitations on circuit configuration. In conventional practice, the circuit constants of equalizer amplifier 13 were selected to implement constant servo characteristics suitable for suppressing intermediate servo characteristics between servo characteristics of great eccentricity amount of rotation and that of a small eccentricity amount, i.e. a standard magnitude of eccentricity.

If the actual eccentricity amount of the rotation of the disc is greatly shifted from this standard eccentricity amount, the capture of the rotation phase of spindle motor 2 to a reference phase becomes difficult with the phase servo characteristics set in advance to deteriorate the accuracy of phase servo control. If it becomes difficult to suppress the time base variation of rotation, the time base variation of the reproduced video signal will not come within the possible correction range of a time base correction (TBC) circuit (not shown) provided for subjecting the reproduced video signal to time base correction. This means that accurate signal processing of the reproduced video signal is not always possible.

This problem is particularly significant in two side reproduction type LD players. Such a two-side reproduction type LD player is disclosed in U.S. Pat. No. 4,839,881, for example, wherein an optical pickup reads out information in the signal face of the lower side of the LD mounted on a chucking device, and then moves to the upper side of the LD to read out information on the signal face thereof.

The eccentricity amount at the time of lower side face reproduction and upper side face reproduction differ due to reasons such as the lower and upper sides of the LD not accurately bonded together in a two-side reproduction type LD player. Therefore, the phase servo characteristics realized to suit the eccentricity amount of the lower side reproduction do not always suit the eccentricity amount of the upper side reproduction. In such a case, time base correction of the reproduced signal from the signal face of the upper side could not be carried out accurately to result in a disturbed reproduced picture.

FIG. 2 is a block diagram showing another example of a conventional motor servo circuit for a LD player. Speed comparison circuit 9, switch circuit 12 and lock detecting circuit 57 shown in FIG. 1 are not depicted in FIG. 2. The phase servo circuit of FIG. 2 differs from the phase servo circuit of FIG. 1 in that the former comprises a gain switching circuit 18 provided between equalizer amplifier 13 and motor driving circuit 16, and a system control circuit 19 implemented by a microcomputer for controlling gain switching circuit 18.

The basic operations of the phase servo circuit of FIG. 2 is similar to that of the phase servo circuit of FIG. 1, except for the output of equalizer amplifier 13 (referred to as the first phase error signal hereinafter) supplied to gain switching circuit 18, whereby the level of the first phase error signal varies according to the type of the reproduced LD. The output of gain switching circuit 18 (referred to as the second phase error signal hereinafter) is supplied to motor driving circuit 16 to implement capture of the rotation phase of spindle motor 2 to a reference phase.

The inertia force required for the rotation of spindle motor 2 is different for a LD having a diameter of 20 cm and a LD having a diameter of 30 cm. If phase servo control is carried out with the same servo gain in all cases according to just the first speed error signal, an appropriate phase servo control may not be obtained due to the servo gain being too high or too low. A status signal (referred to as STAS signal hereinafter) for switching the servo gain is supplied to gain switching circuit 18 from system control circuit 19 according to the type of the reproduced disc, whereby the level of the phase error signal, i.e. the phase servo gain is switched accordingly.

FIG. 3A is a circuit diagram showing an example of a gain switching circuit 18. Gain switching circuit 18 of FIG. 3A is constituted by a discrete circuit comprising dividing resistors Ra and Rb for level adjustment, and an analog switch SW turned on/off by STAS signal. Corresponding to the type of the LD to be reproduced, analog switch SW of gain switching circuit 18 is turned on/off according to STAS signal from system control circuit 19 to change the level of the first phase error signal, whereby the first error signal is converted into a second phase error signal.

FIG. 3B is a circuit diagram showing another example of gain switching circuit 18. Instead of analog switch SW of FIG. 3A, the circuit of FIG. 3B employs a switch circuit formed of transistors Q and Qz, a diode D, bias resistors Rc, Rd, Re, and a bias voltage supply terminal Vcc.

Although the examples of FIGS. 3A and 3B have the servo gain switched into two stages, it is possible to switch the servo gain into three or more stages. In this case, a multi-contact analog switch SW may be implemented using a digital signal of a plurality of bits as STAS signal.

The conventional phase servo control circuit of FIG. 2 requires dedicated gain switching circuits of discrete configuration of a scale according to the number of stages of switching, in order to switch the servo gain according to the type of the disc. If there are many switching stages, the number of components of the gain switching circuit increases, to result in a phase servo circuit of high cost.

SUMMARY OF THE INVENTION

An object of the present invention is to provide a motor servo circuit for a disc reproduction apparatus capable of phase servo control of high precision.

Another object of the present invention is to provide a motor servo circuit for a disc reproduction apparatus that can change the phase servo gain to an optimum gain according to the eccentricity amount of rotation of a disc, without changing the discrete circuit structure for phase servo control.

A further object of the present invention is to provide a motor servo circuit for a disc reproduction apparatus than can change the phase servo gain according to various factors such as the type of the reproduced disc, the reproduction position, and the reproduction mode, without using a dedicated gain switching circuit of a discrete structure.

Briefly stated, the present invention is a motor servo circuit for phase servo controlling a motor that drives the rotation of a disc at the time of reproduction having information including at least a synchronizing signal recorded on the signal face. The motor servo circuit includes a phase comparison circuit, a phase servo circuit, an eccentricity detecting circuit, a gain determining circuit and a gain switching circuit. The phase comparison circuit compares the phase of the synchronizing signal reproduced from a disc at the time of reproduction with a reference phase to generate a phase error signal indicating the phase difference. The phase servo circuit servo-controls the rotation phase of a spindle motor at a constant phase servo gain according to the phase error signal. The eccentricity detecting circuit detects the variation amount of the phase error signal during a predetermined period longer than the rotation period of the disc, after the rotating speed of the disc reaches a predetermined speed and reproduction of signals from the disc becomes possible. The gain determining circuit determines an optimum phase servo gain according to the eccentricity amount of rotation of the disc according to the variation amount of the detected phase error signal. The gain switching circuit changes the phase servo gain of the phase servo circuit to the determined optimum phase servo gain.

According to another aspect of the present invention, a motor servo circuit servo controlling either the phase or the speed of the motor that drives the rotation of a disc at the time of reproduction includes a difference signal generating circuit, a servo circuit, a status information portion, a gain determining circuit and a gain switching circuit, in a disc reproduction apparatus. The difference signal generating circuit compares the detected information of either the phase or speed of the rotation of the disc at the time of reproduction with a predetermined reference information to generate a signal indicating the difference therebetween. The servo circuit servo controls the rotation of the motor with a constant servo gain according to this difference signal. The status information portion detects status information including at least data as to the type of the disc. The gain determining circuit determines the optimum servo gain for the servo circuit according to the detected status information. The gain switching circuit changes the constant servo gain to the determined optimum servo gain.

The main advantage of the present invention is that accurate phase servo control can be carried out with a simple and economical circuit structure, because the servo gain of the entire phase servo circuit is switched to an optimum value according to the eccentricity amount of the rotation of the disc, while the circuit constants of discrete servo circuits such as an equalizer amplifier are fixed.

Another advantage of the present invention is that eccentricity of disc rotation can be suppressed for each signal face because an optimum phase servo gain is realized for each signal face in a two-side automatic reproduction type LD player.

A further advantage of the present invention is that the gain of the entire servo circuit can be switched to an optimum gain with a simple and economical structure without providing separately a gain switching circuit of a discrete structure by digital-modulating the phase or speed error signal according to various factors such as the type of the reproduced disc, the reproduction position and the reproduction mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram schematically showing a motor servo circuit according to a first embodiment of the present invention.

DESCRIPTION OF THE PREFERRED EMBODIMENTS

Figure 1:
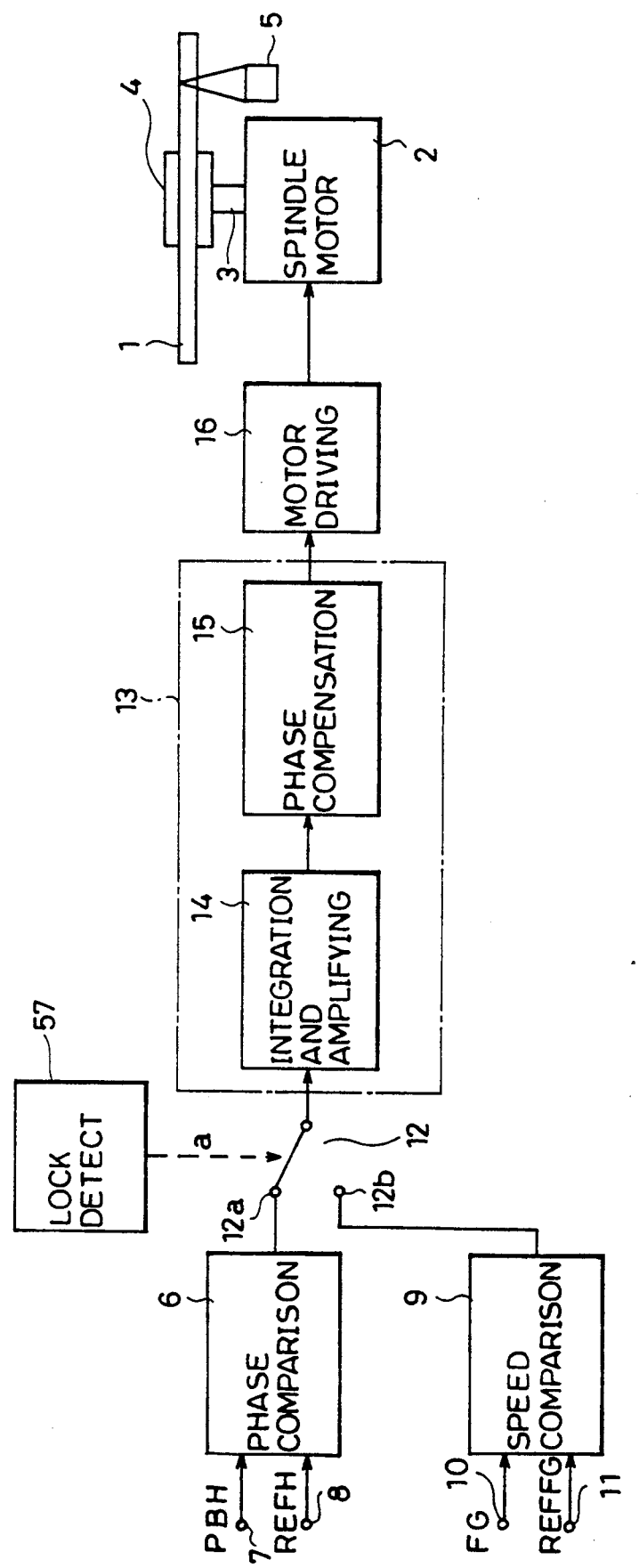
FIG. 1 is a block diagram schematically showing a conventional motor servo circuit of LD player.

FIG. 4 is a block diagram schematically showing a motor servo circuit according to a first embodiment of the present invention. The motor servo circuit of the first embodiment of the present invention of FIG. 4 is similar to the conventional motor servo circuit of FIG. 1 except for the following points.

Referring to FIG. 4, phase error signal ERR1 provided from a phase comparison circuit 6 is supplied to an eccentricity detecting circuit 22 and a duty modulating circuit 23. Eccentricity detecting circuit 22 is supplied with a FG signal from a FG pulse generator not shown via a terminal 10. Eccentricity detecting circuit 22 responds to this FG signal to count the predetermined number of rotations of a spindle motor 2 to detect the range of variation of phase error signal ERR1 during that period, i.e. the magnitude of the eccentricity of the rotation of LD1. A correction constant of the servo gain is determined by a gain determining circuit 24 according to the magnitude of eccentricity detected by eccentricity detecting circuit 22. According to the correction constant, duty modulating circuit 23 changes the duty of phase error signal ERR1 to switch the servo gain of the phase servo circuit. The phase error signal having the duty ratio changed by duty modulating circuit 23 is supplied as signal ERR2 to a contact 12a of switch circuit 12. The functions of phase comparison circuit 6, speed comparison circuit 9, switch circuit 12, eccentricity detecting circuit 22, duty modulating circuit 23, and gain determining circuit 24 are implemented by a microcomputer 20.

Figure 5:
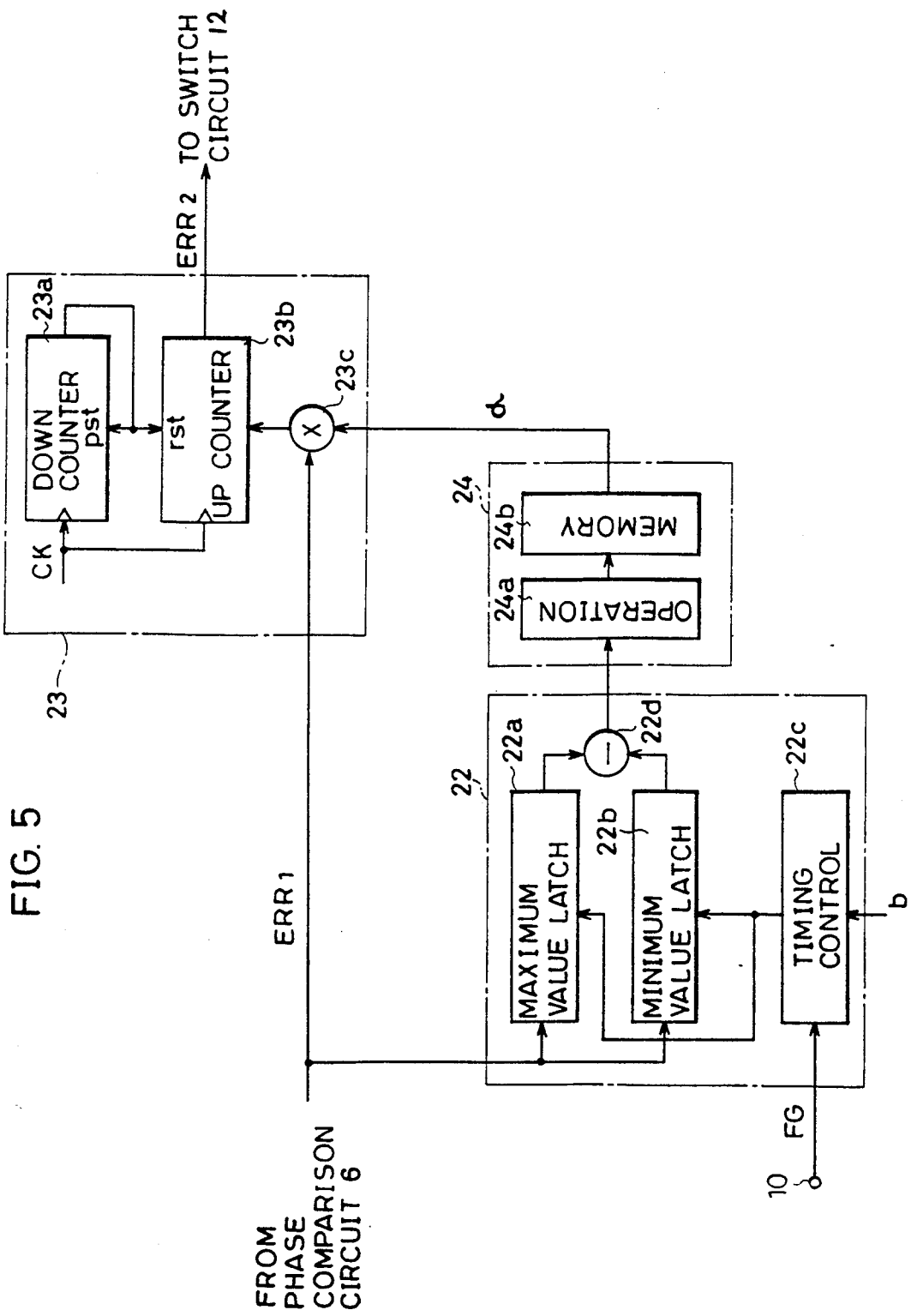
FIG. 5 is a block diagram showing in detail an eccentricity detecting circuit, a duty modulating circuit and a gain determining circuit.

FIG. 5 is a block diagram showing in detail eccentricity detecting circuit 22, duty modulating circuit 23, and gain determining circuit 24 of FIG. 4. Referring to FIG. 5, eccentricity detecting circuit 22 comprises a maximum value latching portion 22a for latching the maximum value of phase error signal ERR1 provided from phase comparison circuit 6, a minimum value latching portion 22b for latching the minimum value of the signal ERR1, a timing control portion 22c for controlling latching portions 22a and 22b, and a subtractor 22d for calculating the difference between the outputs of latching portions 22a and 22b as the eccentricity amount.

Gain determining circuit 24 comprises an operation portion 24a for calculating a correction constant α for changing the phase servo gain to an appropriate servo gain, and a memory 24b for storing the correction constant α. The duty modulating circuit 23 comprises a down-counter 23a and an up-counter 23b for counting the clock pulses provided from a clock signal source not shown, and a multiplier 23c.

Figure 6:
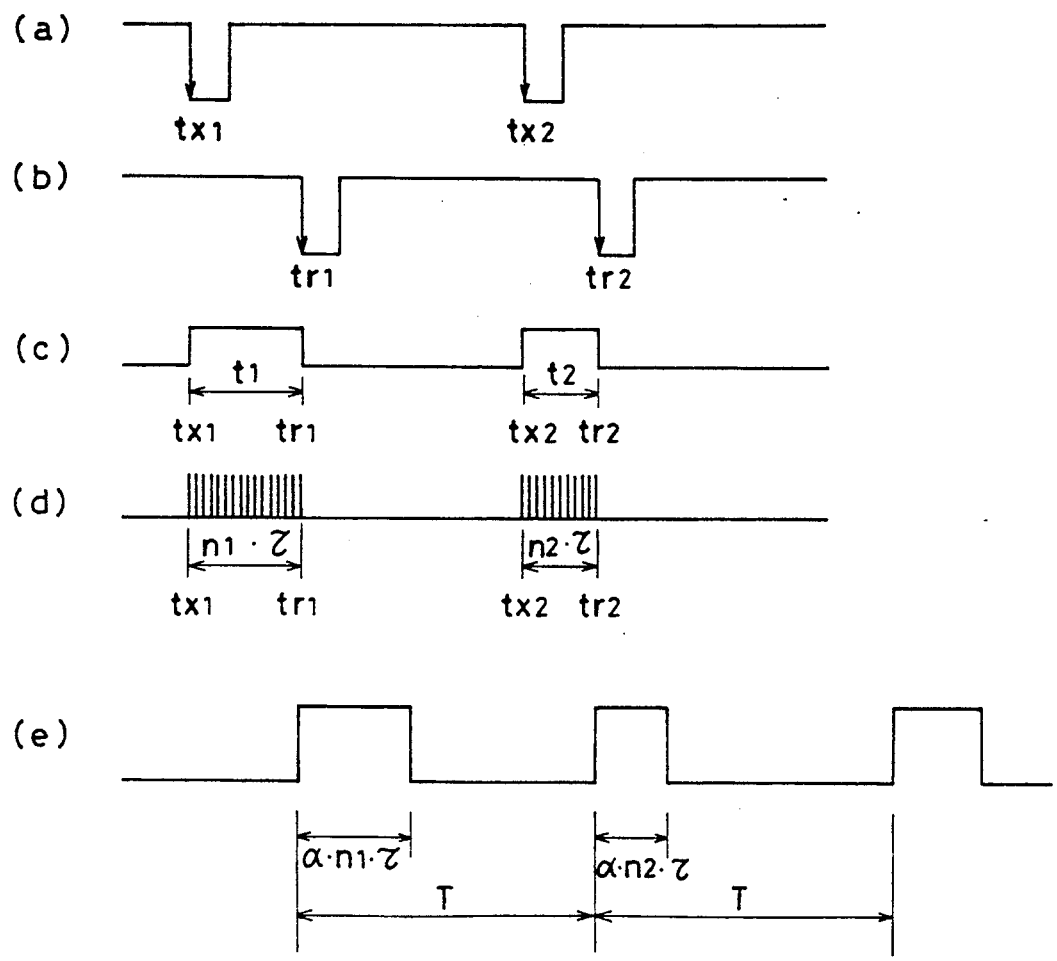
FIG. 6 is a timing chart for explaining the operation of the first embodiment of FIG. 4.
Figure 7:
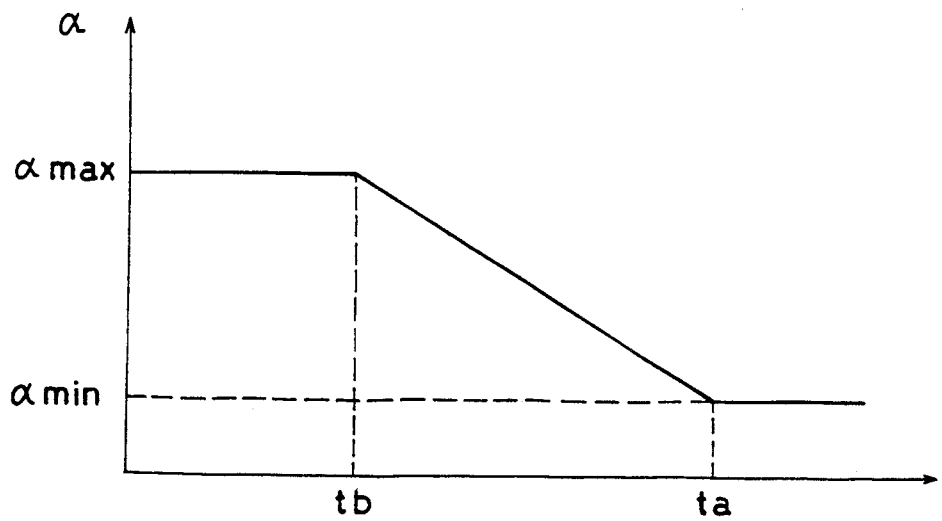
FIG. 7 is a graph indicating the operation characteristics of the first embodiment of FIG. 4.

FIG. 6 is a timing chart and FIG. 7 is a characteristic diagram for explaining the operation of the first embodiment. The operation of the first embodiment will be explained hereinafter with reference to FIGS. 4–7.

After LD1 is mounted on a chucking device 4, spindle motor 2 is actuated by a speed error signal from a speed comparison circuit 9. The rotating speed of spindle motor 2 is captured as mentioned before to a predetermined speed. When the rotating state wherein reproduction of signals from the signal face of LD1 is possible, switch circuit 12 switches to the side of contact 12a according to a speed lock detection signal a from lock detecting circuit 17, as in the conventional example of FIG. 1. One input terminal 7 of phase comparison circuit 6 is supplied with a reproduced horizontal synchronizing signal PBH (FIG. 6 (a)) from a signal processing circuit not shown. More specifically, the lock detecting circuit 17 detects a period of the PBH signal in a manner similar to that of the conventional example. When the detected period comes into a range of ±20% with respect to a predetermined period of 63.5 micro seconds, the lock detecting circuit 17 determines that a speed locked condition is reached and generates the speed lock detection signal a. After this speed lock detection signal a is generated, the lock detecting circuit 17 continues to monitor the PBH signal. When the absolute value of the phase difference between the phases of the PBH signal and REFH signal reaches the value less than a predetermined value, the lock detecting circuit 17 generates a phase lock detection signal b. The other input terminal of phase comparison circuit 6 is supplied with a reference horizontal synchronizing signal REFH (FIG. 6 (b)). Phase comparison circuit 6 compares the timing ($tx_1$, $tx_2$ of FIG. 6 (a)) of the falling edge of PBH signal with the timing ($tr_1$, $tr_2$ of FIG. 6 (b)) of the falling edge of REFH signal to generate a phase error signal ERR1 (FIG. 6 (c)) of pulse widths $t_1$, $t_2$ corresponding to the difference between the aforementioned timing of the PBH signal from the timing of the REFH signal. After the phase lock detection signal b is generated from lock detecting circuit 17, phase error signal ERR1 is applied to maximum value latching portion 22a and minimum value latching portion 22b of eccentricity detecting circuit 22, and to multiplier 23c of duty modulating circuit 23.

The phase error signal ERR1 has the pulse width determined as $t = n_1.\tau$, $t_2 = n_2.\tau$, . . . (FIG. 6 (d)) by counting the internal clock pulses having a period $\tau$ ($\tau < t_1, t_2$) of microcomputer 20. The lead or lag of the PBH signal phase to REFH signal phase is represented by adding a positive or negative sign.

When timing control circuit 22c of eccentricity detecting circuit 22 detects that LD1 has reached a rotating state possible for reproduction, according to the phase lock detection signal b provided from lock detecting circuit 17, timing control circuit 22c activates maximum value latching portion 22a and minimum value latching portion 22b during the period of spindle motor 2 rotating by a predetermined number of rotation by counting a predetermined number of FG pulses.

During the activation period, these latching portions 22a and 22b automatically repeat latching to latch the maximum value data and minimum value data of the pulse width of phase error signal ERR1 during the period of spindle motor 2 rotating for a predetermined number of rotation.

The maximum and minimum values of the ERR signal held in latching portions 22a and 22b, respectively, are provided to subtractor 22d. Subtractor 22d provides the difference between these data, i.e. an output corresponding to the magnitude of the variation range of ERR1 signal.

The output provided from subtractor 22d corresponds to the eccentricity amount of the LD rotation caused by the eccentricity of the LD itself or the eccentricity of the chucking device. The output from subtractor 22d is provided to operation portion 24a of gain determining circuit 24. Operation portion 24a calculates a correction constant $\alpha$ for implementing an appropriate servo gain for the eccentricity amount according to the predetermined characteristics of FIG. 7, for example.

Referring to the characteristics of FIG. 7, the capture of the rotation phase of spindle motor 2 to the reference phase is accelerated by maximizing the correction constant $\alpha$ to the maximum value $\alpha_{max}$ to increase the phase servo gain when the eccentricity amount is reduced. When the eccentricity amount is increased, the capture to the reference phase is retarded by minimizing the correction constant $\alpha$ to the minimum value $\alpha_{min}$ to reduce the phase servo gain. This is carried out to suppress current consumption and heat generation. In the graph of FIG. 7, ta and tb in the abscissa, respectively indicate the upper limit value and the lower limit value of the saturation of correction constant $\alpha$.

The correction constant $\alpha$ determined by operation portion 24a is stored in a memory 24b. The predetermined constant $\alpha_0$ of a predetermined reference servo gain held in memory 24b as the initial value is changed to the newly determined correction constant $\alpha$.

Multiplier 23c of duty modulating circuit 23 functioning as a gain switching circuit has one input supplied with phase error signal ERR1 from phase comparison circuit 6 and the other input supplied with correction constant $\alpha$ from memory 24b. Multiplier 23c multiplies the pulse width of ERR1 signal by $\alpha$ to generate the data having pulse width of $\alpha.n_1.\tau$, $\alpha.n_2.\tau$, . . . and provides the same to the up-counter 23b.

Down-counter 23a always counts down internal clock pulses CK of microcomputer 20. When the counted value becomes 0, down counter 23a is self-preset by data corresponding to modulation period T (FIG. 6 (e)) equivalent to the periods of the falling edge $tr_1$, $tr_2$ of REFH signal. This count down operation is repeated. Thus, down-counter 23a repeatedly counts modulation period T.

Up-counter 23b is instantly reset in synchronism with the self-preset of down counter 23a and begins right after the reset to count up internal clock pulses CK during the period of the $\alpha$ multiplied pulse width of ERR1 signal. As a result, a phase error signal ERR2 of period T with the pulse width modulated is provided (FIG. 6 (e)) having a pulse width of $\alpha.n_1.\tau$, $\alpha.n_2.\tau$, . . . that is $\alpha$ times the pulse width of ERR1 signal. Thus, duty modulating circuit 23 functions as a circuit digital-modulating the duty ratio of a signal of a constant period T.

Phase error signal ERR2 obtained in the above manner is applied to equalizer amplifier 13 of FIG. 4, where phase servo control of spindle motor 2 is carried out in a manner identical to that of the conventional example of FIG. 1.

The circuit constants of the discrete integration and amplifying circuit 14 and phase compensation circuit 15 forming equalizer amplifier 13 are fixed at this time. Therefore, the phase servo gain according to equalizer amplifier 13 is constant. However, the servo gain of the entire phase servo circuit of FIG. 4 is switched to an optimum servo gain according to the actual eccentricity amount of the disc rotation during reproduction, because the phase error signal itself is converted (digital-modulated) from ERR1 signal to ERR2 signal according to the eccentricity amount of the disc rotation.

Figure 8:
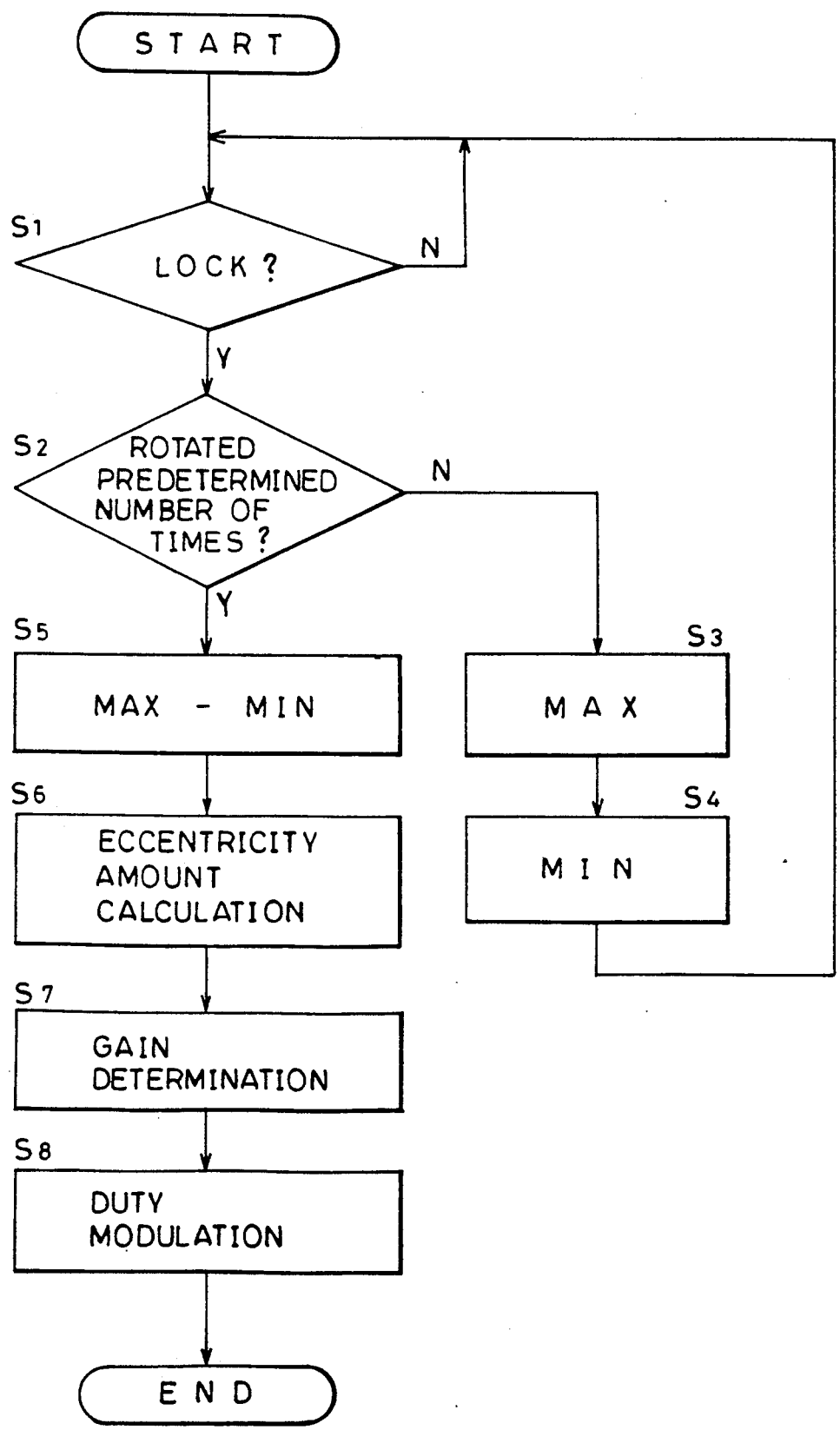
FIG. 8 is a flow chart for explaining the operation of the first embodiment of FIG. 4.

FIG. 8 is a flow chart for explaining the operation of microcomputer 20 of the above mentioned first embodiment. Referring to FIG. 8, at step S1, determination is first made whether the phase servo is locked, i.e. whether the rotation phase of spindle motor 2 is captured to the reference phase. Then, at step S2, determination is made whether spindle motor 2 has rotated by a predetermined number of rotation according to the counted value of the FG pulses. During the period until motor 2 has rotated by the predetermined number of times, the maximum and minimum values of phase error signal ERR1 are latched respectively at steps S3 and S4.

If determination is made that spindle motor 2 has rotated by a predetermined number of times at step S2, the difference between the maximum value and the minimum value of the above mentioned phase error signal ERR1 is obtained at step S5, whereby the eccentricity amount of rotation of the disc is detected at step S6.

At step S7, correction constant α of the phase servo gain is determined according to the detected eccentricity amount. At step S8, the duty of the phase error signal ERR1 is modulated according to the terminated constant α. With this phase error signal ERR2 having a modulated duty ratio, phase servo control is carried out for spindle motor 2.

The above mentioned correction constant α is held in memory 24b and read out to multiplier 23c until the LD mounted on chucking device 4 is removed.

The calculation of correction constant α of operation portion 24a may be carried out by preparing in advance a table of a combination of the eccentricity amount and correction constant α according to the characteristics and use this table, instead of specifying an equation having a characteristics of FIG. 7.

The characteristics for determining the correction constant may be specified appropriately according to various factors such as the eccentricity characteristics of the disc and the eccentricity characteristics of the chucking device.

Although the functions of phase comparison circuit 6, speed comparison circuit 9, switch circuit 12, lock detecting circuit 17, eccentricity detecting circuit 22, duty modulating circuit 23, and gain determining circuit 24 are implemented by a microcomputer 20 in the above described first embodiment, they may be implemented by discrete circuits.

Thus, according to the first embodiment of the present invention, the servo gain of the entire phase servo circuit can be switched to an optimum value according to the actual eccentricity amount of the disc rotation, while fixing the circuit constants of the discrete circuits such as integration and amplifying circuit 14 and phase compensation circuit 15.

Figure 9:
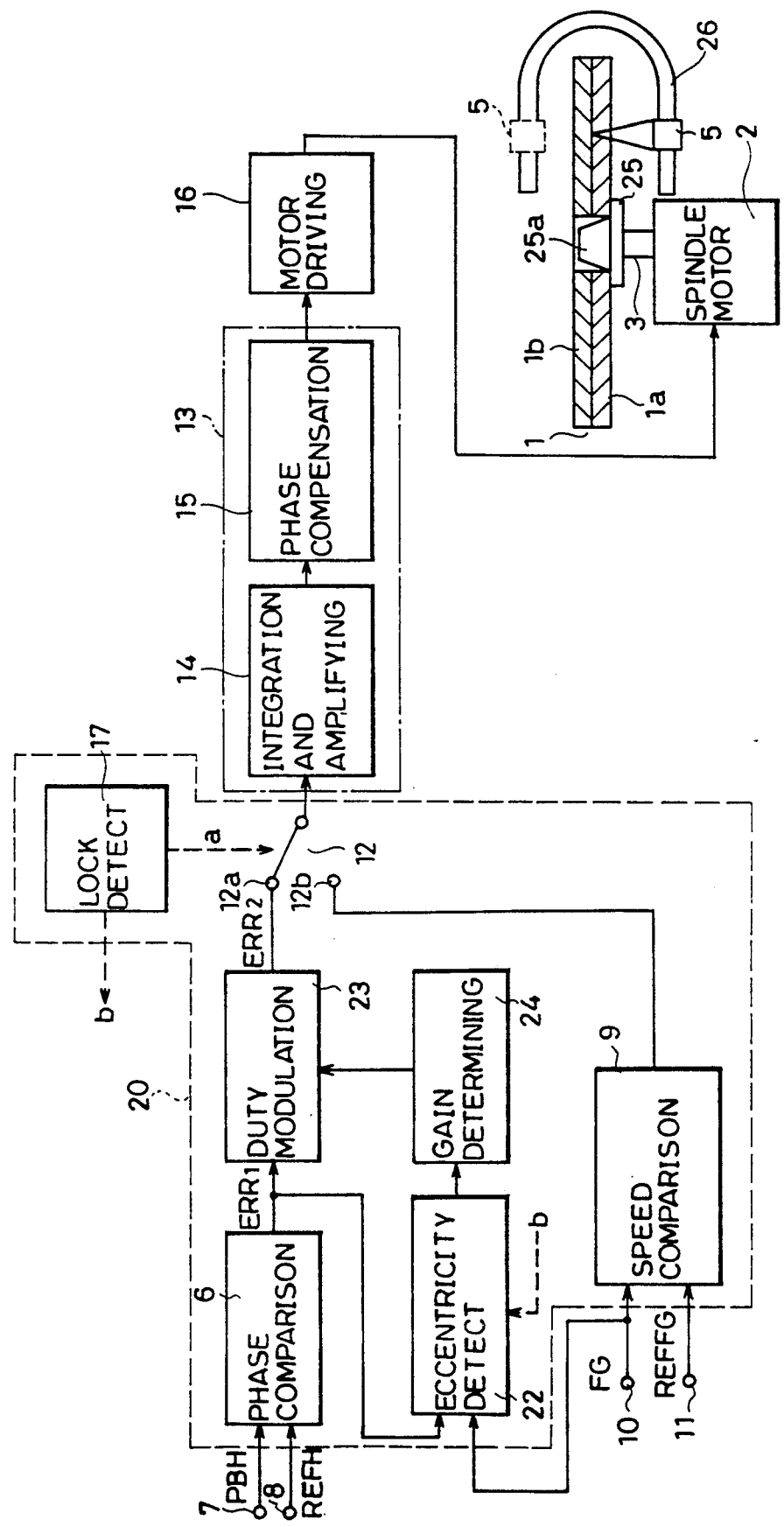
FIG. 9 is a block diagram schematically showing a modification of the first embodiment of FIG. 4.

The first embodiment is advantageous when applied to a two-side automatic reproduction type LD player. FIG. 9 is a block diagram schematically showing a modification wherein the above described first embodiment is applied to a two-side automatic reproduction type LD player.

Referring to FIG. 9, optical pickup 5 is attached to a U-shaped guide member 26 movably. In the initial state of reproduction of LD, optical pickup 5 is placed under the lower side face of LD1 so as to read out signals from the lower side face of LD1 in a manner similar to that of the first embodiment shown in FIG. 4. During such reproduction, correction constant α corresponding to the eccentricity amount of the rotation of the lower side face is calculated, so that an optimum phase servo gain is obtained with respect to the reproduction of the lower side face.

After the reproduction of the lower side face of LD1 is finished, optical pickup 5 moves to the position over the upper side face of LD1 (position indicated by broken line) along the guide member 26. Then, optical pickup 5 successively start to reproduce signals from the innermost circumference of the upper side face of LD1.

In FIG. 9, a turntable 25 forming chucking device is shown while clamper is not shown. As shown in FIG. 9, since LD1 is mounted on turntable 25 by fitting a spindle member 25a projecting at the center of turntable 25 into a central hole of the lower side face 1a of LD1, a reference surface of chucking is set to the lower side face. Generally, LD1 is formed by bonding two discs together each having signals recorded thereon. Accordingly, eccentricity of the upper side face occurs with respect to the lower side face. As a result, when the signals are reproduced from the upper side face 1b, a large amount of eccentricity occurs corresponding to the total amount of the eccentricity amount of the lower side face caused by chucking device and that of the upper side face caused with respect to the lower side face.

According to the embodiment shown in FIG. 9, correction constant α is calculated again when starting the reproduction of the upper side face, so that an optimum phase servo gain is realized with respect to the reproduction of the upper side surface.

That is to say, at the time of reproduction, a correction constant is selectively read out according to the reproduced signal face to implement an optimum phase servo gain for the reproduced face, because a correction constant α according to each side is determined and held when information recorded on each of two sides of the LD is first reproduced.

Figure 10:
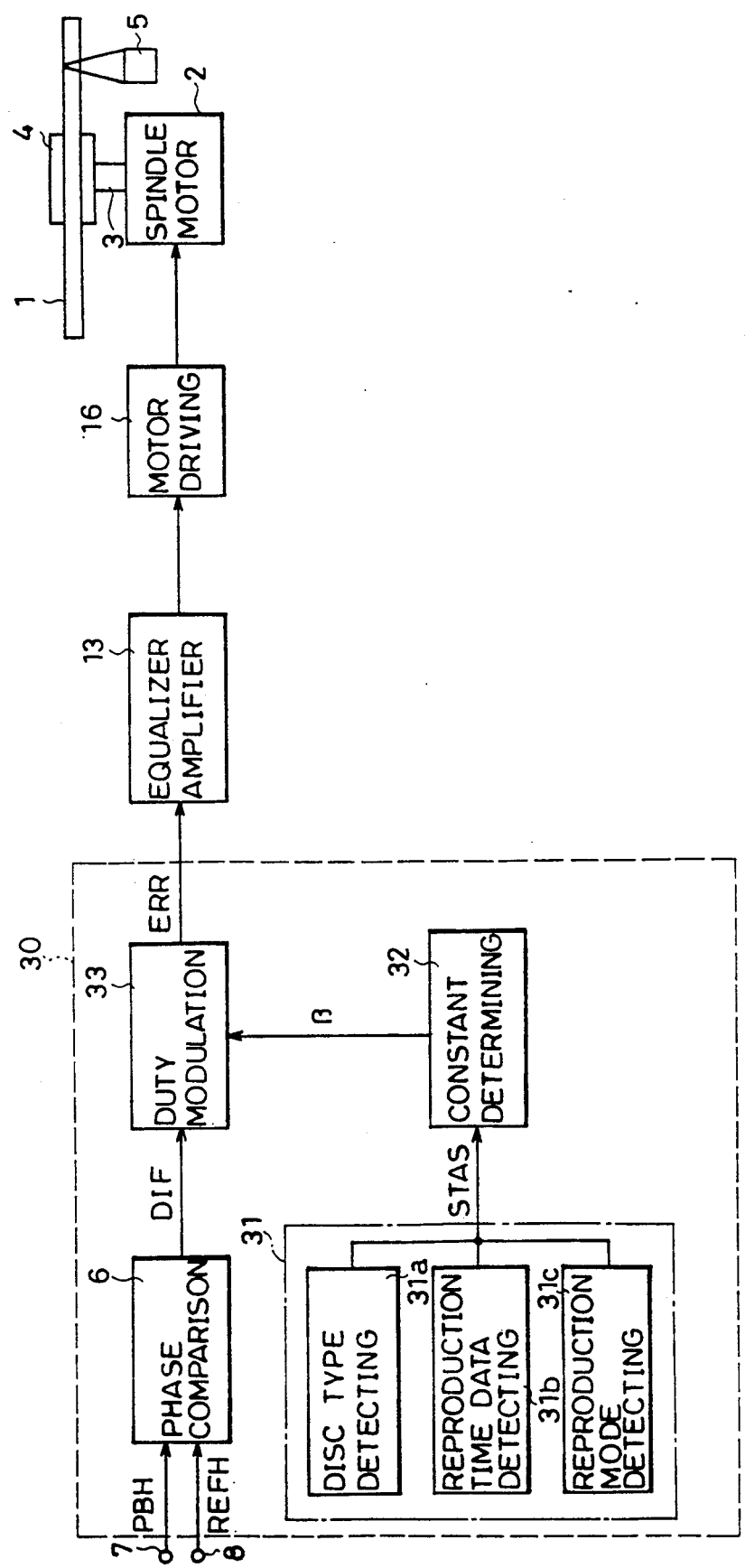
FIG. 10 is a block diagram schematically showing a motor servo circuit according to a second embodiment of the present invention.

FIG. 10 is a block diagram schematically showing a motor servo circuit according to a second embodiment of the present invention. FIG. 10 shows the case where the second embodiment is applied to a phase servo circuit of a LD player having the reproduction function of various optical discs such as a LD, a CDV and a CD. Similar to the conventional example of FIG. 2, the speed servo circuit is not depicted. The second embodiment of FIG. 10 is similar to the conventional motor servo circuit of FIG. 2 except for the following points.

Figure 2:
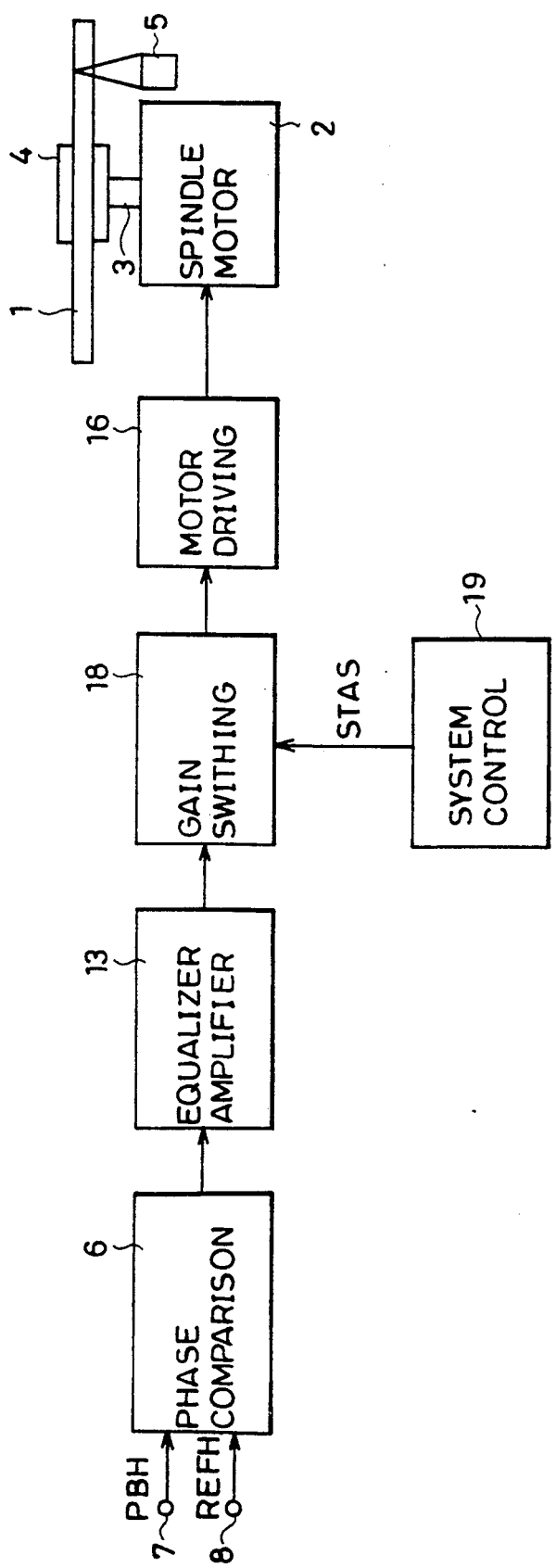
FIG. 2 is a block diagram schematically showing another example of a conventional motor servo circuit.
Figure 3A:
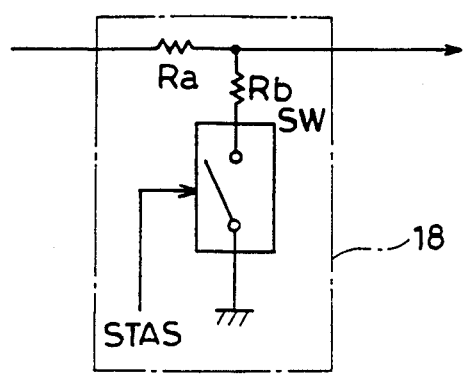
FIGS. 3A and 3B are circuit diagrams showing in detail gain switching circuits of the motor servo circuit of FIG. 2.
Figure 3B:
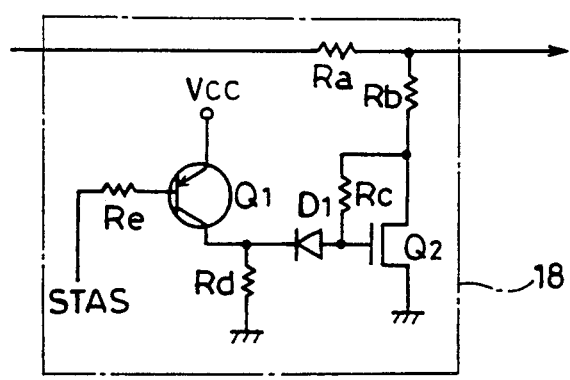

Referring to FIG. 10, phase difference signal DIF provided from phase comparison circuit 6 is supplied to duty modulating circuit 33. Status information portion 31 comprises a disc type detecting portion 31a, a reproduction time data detecting portion 31b and a reproduction mode detecting portion 31c, whereby the outputs of these detecting portions are combined as a status signal STAS and supplied to a constant determining circuit 32. Constant determining circuit 32 responds to STAS signal for generating a modulating constant β and provides the same to duty modulating circuit 33. Duty modulating circuit 33 responds to correction constant β to generate a phase error signal ERR by modifying the duty ratio of phase difference signal DIF. This phase error signal ERR is supplied to equalizer amplifier 13. The gain switching circuit 18 in the conventional example of FIG. 2 is omitted in the second embodiment. The functions of phase comparison circuit 6, status information portion 31, constant determining circuit 32 and duty modulating circuit 33 are implemented by microcomputer 30.

Figure 11:
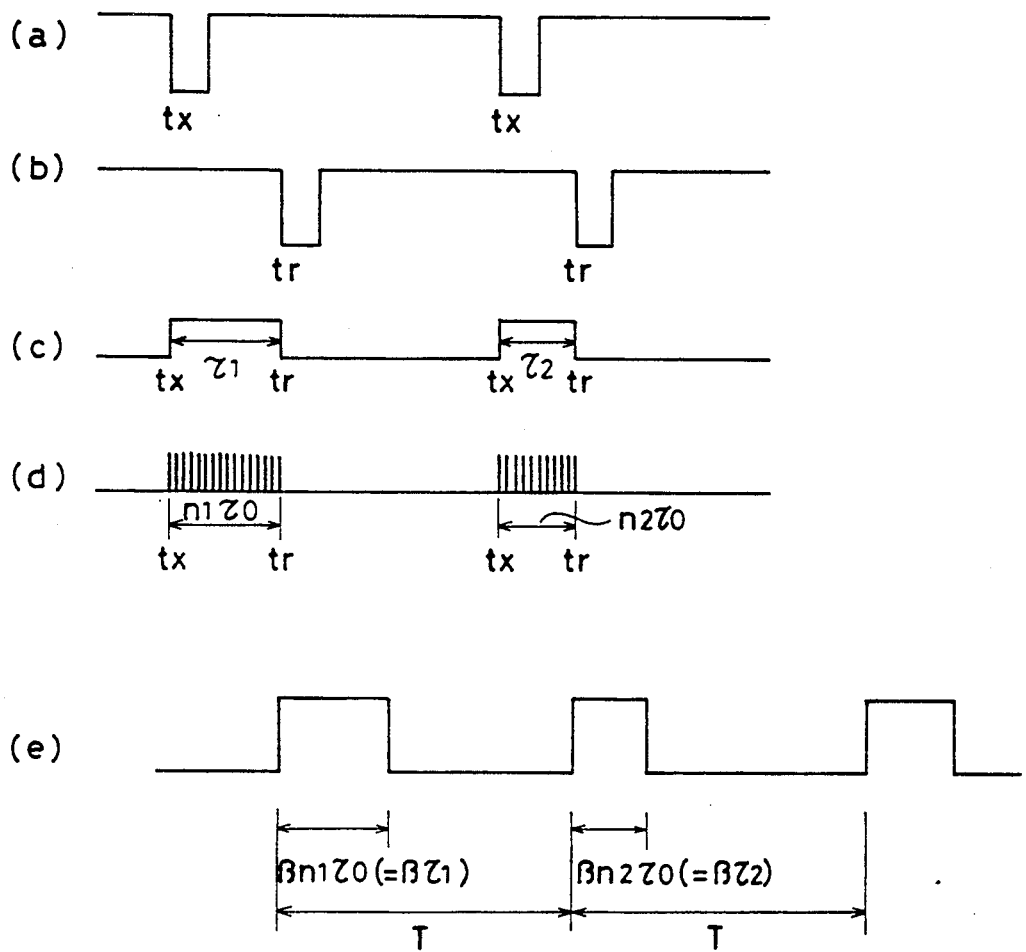
FIGS. 11 and 12 are timing charts for explaining the operation of the second embodiment of FIG. 10.
Figure 12:
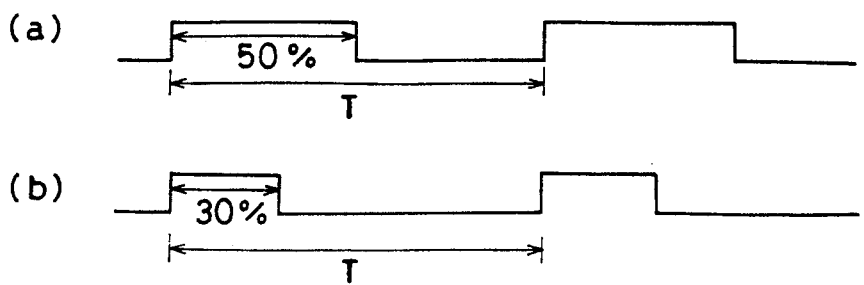

FIGS. 11 and 12 are timing charts for explaining the operation of the second embodiment of FIG. 10. The operation of the second embodiment of the present invention will be explained hereinafter with reference to FIGS. 10 and 12.

After a LD, a CDV or a CD is mounted on chucking device 4, spindle motor 2 is actuated by a speed error signal from a speed servo circuit not shown, whereby the rotating speed is captured to a predetermined speed. When a state is established where signals from the signal face of the disc can be reproduced, a PBH signal (FIG. 11 (a)) is supplied to one input terminal 7 of phase comparison circuit 6. The other input terminal 8 of phase comparison circuit 6 is supplied with a REFH signal (FIG. 11 (b)). Phase comparison circuit 6 detects the lead or lag of the falling edge (tx in FIG. 11 (a)) of PBH signal based on the timing (tr of FIG. 11 (b)) of the falling edge of REFH signal. According to the detected result, a phase difference signal DIF (FIG. 11 (c)) is generated indicating the phase difference $\tau_1, \tau_2, \ldots$ between the falling edges of tx and tr. This DIF signal is supplied to duty modulating circuit 33.

The second embodiment of FIG. 10 is provided with a status information portion 31 for switching the phase servo gain according to various factors such as the type of the reproduced disc, the reproduction position and the reproduction mode. Status information portion 31 comprises various detecting portions 31a, 31b and 31c. Disc type detecting portion 31a detects the type of the disc, that is to say, whether the reproduced disc is a LD of 20 cm diameter, a LD of 30 cm diameter, a CDV, or a CD.

When a CLV is reproduced, that is, the rotating number is to be changed according to the reproduction position of pickup, reproduction time data detecting portion 31b detects the current reproduction position on the signal face according to the reproduction time data included in the reproduced signal from optical pickup 5. Reproduction mode detecting portion 31c detects the set reproduction mode such as normal reproduction mode, scan reproduction mode and still reproduction mode. The detected data provided from detecting portions 31a–31c are combined to be supplied to constant determining circuit 32 as a STAS signal of multiple bits corresponding to the STAS signal shown in the conventional example of FIG. 2.

In constant determining circuit 32, a modulating constant $\beta$ that switches the gain of the phase servo circuit is set in advance to achieve an optimum phase servo gain corresponding to various combinations of the type of the reproduced disc, the reproduction position on the reproduction face, and the reproduction mode. Constant determining circuit 32 reads out the corresponding modulating constant $\beta$ according to the STAS signal provided from status information portion 31 that is a combination of various detected data.

Duty modulating circuit 33 determines the pulse width of $\tau_1, \tau_2, \ldots$ of the phase difference signal DIF respectively as $n_1 \cdot \tau_0, n_2 \cdot \tau_0, \ldots$ (FIG. 11 (d)) by counting the internal clock pulses having a constant period $\tau_0$ ($\tau_0 < \tau_1, \tau_2$) of microcomputer 30. The phase difference signal DIF is digital-modulated by multiplying phase difference signal DIF by modulating constant $\beta$ provided from constant determining circuit 32. Because the structure of duty modulating circuit 33 is substantially similar to duty modulating circuit 23 of the first embodiment of FIG. 5, the detail description will not be repeated.

According to this digital modulation, a phase error signal ERR having a constant period T equivalent to the period of tr of the falling edge of the REFH signal, and having the duty ratio thereof modulated by modulating constant $\beta$ is produced. This phase error signal ERR is supplied to equalizer amplifier 13. In a manner similar to that of the aforementioned conventional example, phase servo control is carried out for spindle motor 2.

Even if the phase difference indicated by phase difference signal DIF is the same for reproduction of a LD of 20 cm diameter and a LD of 30 cm diameter, phase difference signal DIF is digital-modulated by different modulating constants $\beta$ according to the type of the reproduced disc. Therefore, the duty ratio of the phase error signal is modified to different values of 50% and 30% according to the type of the disc, as shown in FIG. 12 (a) and (b). As a result, an optimum phase servo gain is implemented for the entire phase servo circuit according to various factors such as the type of the reproduced disc, the reproduction position and the reproduction mode.

Figure 13:
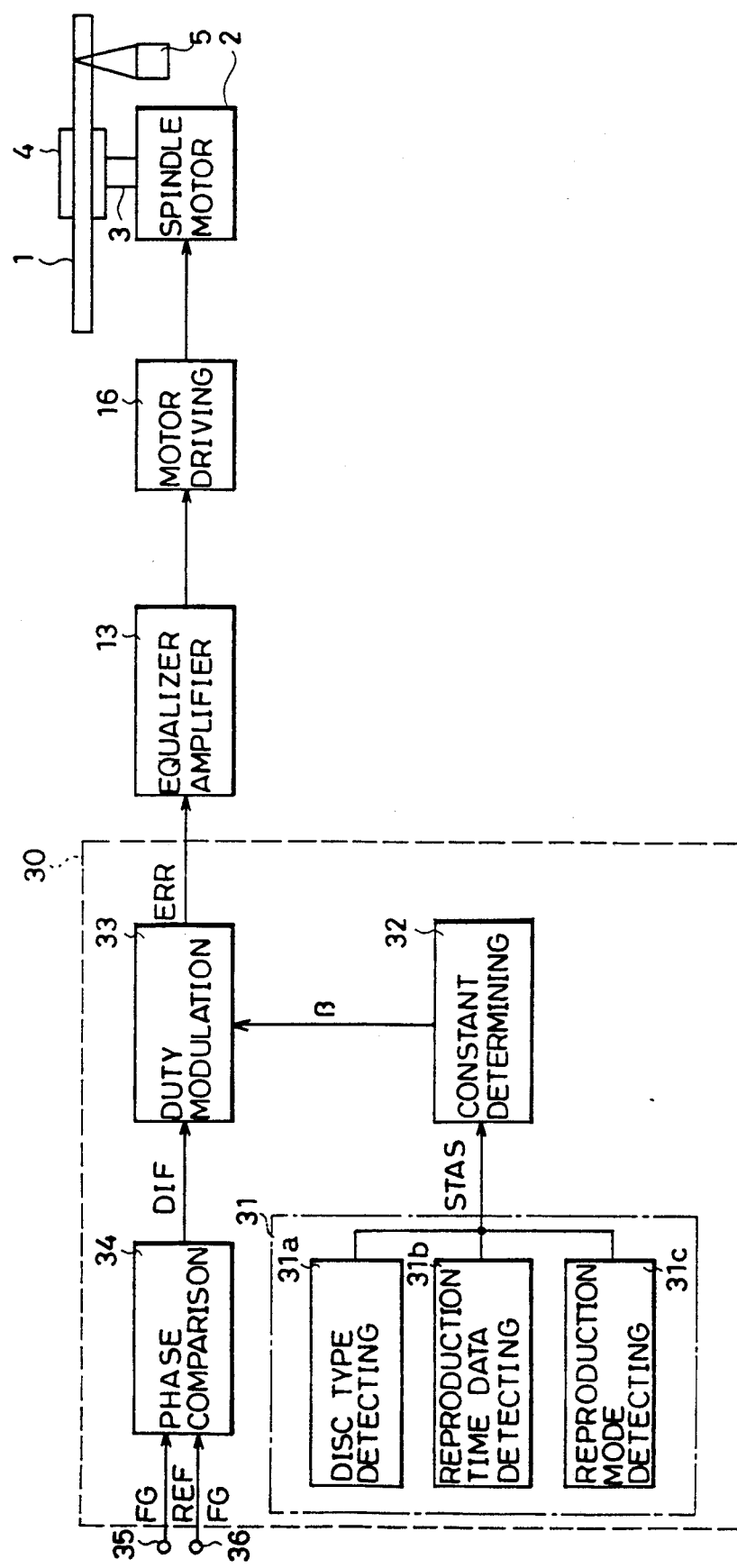
FIGS. 13 and 14 are block diagrams showing modifications of the second embodiment of FIG. 10.
Figure 14:
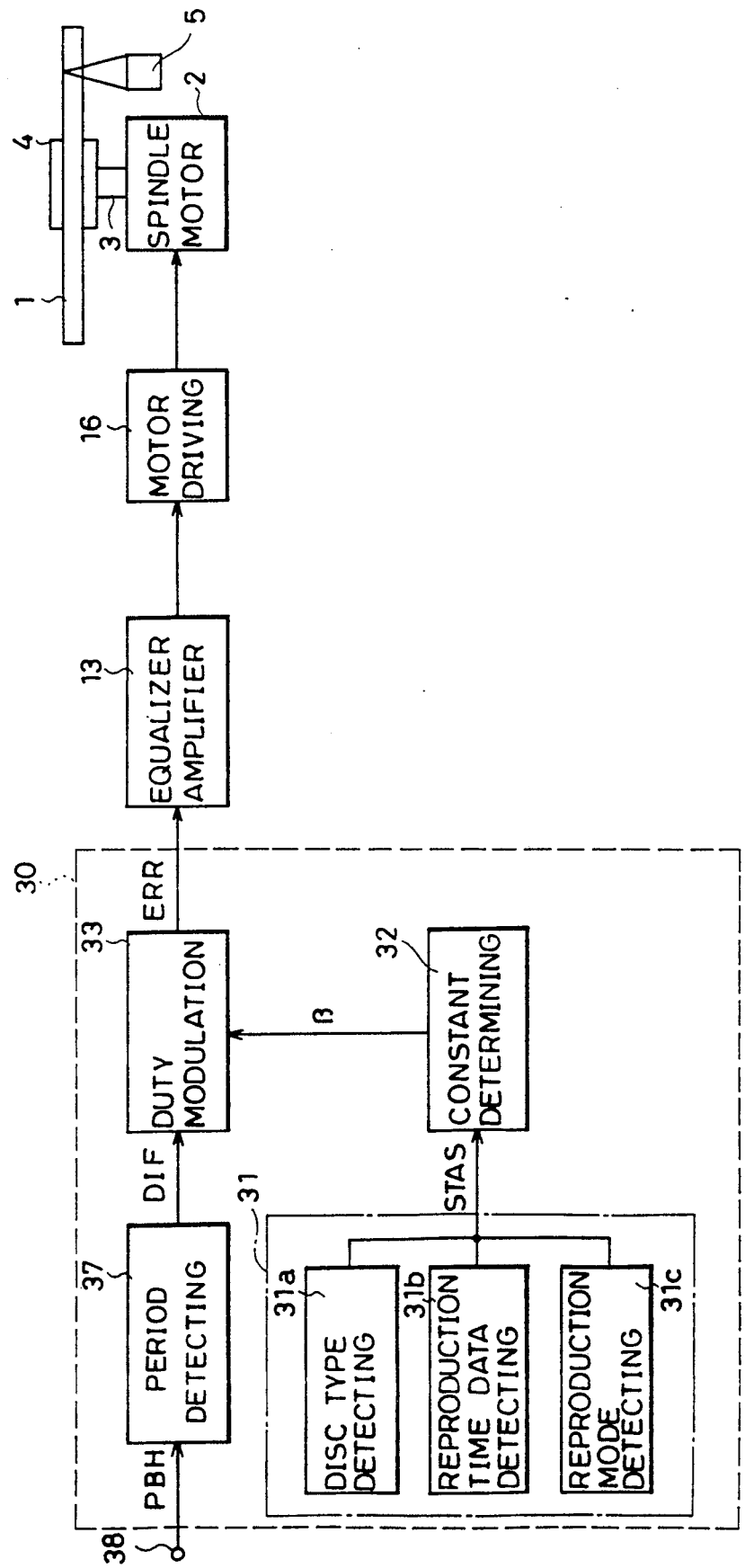

The second embodiment is not limited to the phase servo circuit of FIG. 10 and may be applied to other various motor servo circuits. FIGS. 13 and 14 are block diagrams schematically showing modifications wherein the second embodiment of the present invention is applied to a speed servo circuit of a LD player.

In the speed servo circuit of FIG. 13, the phase of the FG signal from a FG pulse generator not shown via a terminal 35 is compared with the phase of the REFG signal supplied from an oscillator circuit not shown via terminal 36 by phase comparison circuit 34. Speed servo control is carried out for the rotating speed of spindle motor 2 according to the resultant FG phase difference signal. In the speed servo circuit of FIG. 14, the period of the reproduced horizontal synchronizing signal PBH provided via terminal 38 is detected by period detecting circuit 37 and compared with a predetermined period. The speed servo control of the rotating speed of spindle motor 2 is carried out according to the result of comparison.

In accordance with the second embodiment of the present invention, the gain of the entire servo circuit can be switched with a simple and economical structure without providing a gain switching circuit of discrete structure, by digital-modulating a phase or speed error signal in a software manner according to various factors such as the type of the reproduced disc, the reproduction position and reproduction mode.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor servo circuit for phase servo controlling a motor which drives the rotation of a disc at the time of reproduction having information including at least a synchronizing signal recorded on a signal face in a disc reproduction apparatus, said motor servo circuit comprising:

phase comparison means for comparing the phase of said synchronizing signal reproduced from said disc at the time of reproduction with a reference phase to generate a signal indicating the phase difference therebetween;

phase servo means for servo controlling the rotation phase of said motor with a constant phase servo gain according to said signal indicating the phase difference;

eccentricity detecting means for detecting the variation amount of said phase difference during a predetermined period longer than the rotation period of said disc, after the rotating speed of said disc reaches a predetermined speed and reproduction of signals from said disc becomes possible;

gain determining means for determining an optimum phase servo gain according to the eccentricity amount of the rotation of said disc which is determined according to said variation amount of said detected phase difference; and gain switching means for modifying said constant phase servo gain to said determined phase servo gain.

2. The motor servo circuit according to claim 1, wherein said signal indicating said phase difference is a phase error signal having a pulse width corresponding to the phase difference between the phase of said reproduced synchronizing signal and that of said reference signal.

3. The motor servo circuit according to claim 2, wherein said phase servo means includes equalizer amplifier means for subjecting said phase error signal to integration and amplification as well as phase compensation process with fixed circuit characteristics.

4. The motor servo circuit according to claim 2, wherein said eccentricity detecting means comprises means for latching the maximum value and the minimum value of said phase error signal during said predetermined period, and means for calculating the difference between said latched maximum value and minimum value.

5. The motor servo circuit according to claim 4, wherein said gain determining means includes
means for determining an optimum phase servo gain to suppress eccentricity of the rotation of said disc according to the variation amount of said detected phase error signal, using a predetermined relation between said eccentricity amount of the rotation of said disc and said phase servo gain, and
means for holding a signal representing said determined optimum phase servo gain.

6. The motor servo circuit according to claim 5, wherein said relation between said eccentricity amount of the rotation of said disc and said phase servo gain is set in advance so that the phase servo gain is increased as the eccentricity amount is reduced and the phase servo gain is reduced as the eccentricity amount is increased.

7. The motor servo circuit according to claim 5, wherein said gain switching means includes means for digital-modulating the duty ration of said phase error signal according to said signal indicating said determined optimum phase servo gain.

8. The motor servo circuit according to claim 1, wherein the functions of said phase comparison means, said eccentricity detecting means, said gain determining weans and said gain switching means are implemented in a software manner by a microcomputer.

9. The motor servo circuit according to claim 1, wherein said disc reproduction apparatus is two-side automatic reproduction type disc reproduction apparatus, and said gain determining means determines an optimum phase servo gain for each side of said disc.

10. A motor servo circuit for servo controlling the phase or the speed of a motor which drives the rotation of a disc at the time of reproduction in a disc reproduction apparatus, said motor servo circuit comprising:

information comparison means for comparing detected information of either the phase or speed of the rotation of said disc with a predetermined reference information to generate a signal indicating the difference therebetween;

servo means for servo controlling the rotation of said motor with a constant servo gain according to claim signal indicating the difference;

status information means for detecting status information including at least data relating to the type of said disc;

gain determining means for determining an optimum servo gain of said servo means according to said detected status information;

gain switching means for modifying said constant servo gain to said determined optimum servo gain; and eccentricity detecting means for detecting the variation amount of said phase difference during a predetermined period longer than the rotating period of said disc, after the rotating speed of said disc reaches a predetermined speed and reproduction of signals from said disc becomes possible.

11. The motor servo circuit according to claim 10, wherein said information comparison means includes phase comparison means for generating a phase error signal having a pulse width corresponding to the phase difference between the rotation phase of said disc and a reference phase.

12. The motor servo circuit according to claim 11, wherein said servo means includes equalize amplifying means for subjecting said phase error signal to integration and amplification as well as phase compensation process with fixed circuit characteristics.

13. The motor servo circuit according to claim 11, wherein said status information means includes
means for detecting a first data relating to the type of said disc, means for detecting a second data relating to the reproduction position on said disc, and means for detecting a third data relating to the reproduction mode of said disc.

14. The motor servo circuit according to claim 13, wherein said gain determining means includes means for determining an optimum phase servo gain according to said detected status information using a predetermined relation between said first through third data and said phase servo gain.

15. The motor servo circuit according to claim 14, wherein said gain switching means includes means for digital-modulating the duty ratio of said phase error signal according to said signal indicating said determined optimum phase servo gain.

16. The motor servo circuit according to claim 10, wherein said information comparison means includes speed comparison means for generating a speed error signal having a pulse width corresponding to the speed difference between the rotation speed of said disc and a reference speed.

17. The motor servo circuit according to claim 16, wherein said servo means includes equalizer amplifying means for subjecting said speed error signal to integration and amplification as well as phase compensation process with fixed circuit characteristics.

18. The motor servo circuit according to claim 16, wherein said status information means includes
   means for detecting a first data relating to the type of said disc;
   means for detecting a second data relating to the reproduction position on said disc; and
   means for detecting a third data relating to the reproduction of mode of said disc.

19. The motor servo circuit according to claim 18, wherein said gain determining means includes means for determining an optimum speed servo gain according to said detected status information using a predetermined relation between said first through third data and said speed servo gain.

20. The motor servo circuit according to claim 19, wherein said gain switching means includes mean for digital-modulating the duty ratio of said speed error signal according to said signal indicating said determined optimum speed servo gain.

21. The motor servo circuit according to claim 20, wherein the functions of said information comparison means, said status information means, said gain determining means and said gain switching means are implemented in a software manner by a microcomputer.

* * * * *